US 12,055,788 B2

(12) United States Patent
Hertwig et al.

(10) Patent No.: US 12,055,788 B2
(45) Date of Patent: Aug. 6, 2024

(54) THERMALLY ACTUATED ADAPTIVE OPTICS

(71) Applicant: Coherent, Inc., Santa Clara, CA (US)

(72) Inventors: Michael Hertwig, San Ramon, CA (US); Keith M. Murdoch, San Jose, CA (US)

(73) Assignee: Coherent, Inc., Santa Clara, CA (US)

( * ) Notice: Subject to any disclaimer, the term of this patent is extended or adjusted under 35 U.S.C. 154(b) by 435 days.

(21) Appl. No.: 17/360,726

(22) Filed: Jun. 28, 2021

(65) Prior Publication Data
US 2022/0413259 A1 Dec. 29, 2022

(51) Int. Cl.
G02B 7/182 (2021.01)
G02B 7/18 (2021.01)

(52) U.S. Cl.
CPC .......... *G02B 7/1815* (2013.01); *G02B 7/182* (2013.01)

(58) Field of Classification Search
CPC ............................. G02B 7/1815; G02B 7/182
USPC ........................................ 359/846, 847, 849
See application file for complete search history.

(56) References Cited

U.S. PATENT DOCUMENTS

| 4,725,144 | A | * | 2/1988 | Nelson | ................ | G01B 9/02039 |
| | | | | | | 359/849 |
| 4,944,580 | A | * | 7/1990 | MacDonald | ........... | G02B 26/06 |
| | | | | | | 359/849 |
| 5,940,203 | A | | 8/1999 | LaFiandra | | |
| 6,193,381 | B1 | | 2/2001 | Holler | | |
| 6,275,325 | B1 | | 8/2001 | Sinclair | | |
| 6,647,164 | B1 | | 11/2003 | Weaver et al. | | |
| 6,843,572 | B2 | * | 1/2005 | Shiraishi | ................ | G02B 7/182 |
| | | | | | | 359/848 |

(Continued)

FOREIGN PATENT DOCUMENTS

| CN | 105259651 B | 12/2017 |
| CN | 208705570 U | 4/2019 |

(Continued)

OTHER PUBLICATIONS

International Search Report and Written Opinion received for International Patent Application No. PCT/US2022/029251 mailed on Aug. 16, 2022, 19 pages.

(Continued)

*Primary Examiner* — Ricky D Shafer

(74) *Attorney, Agent, or Firm* — Morrison & Foerster LLP

(57) ABSTRACT

A thermally actuated adaptive optic includes a base, a reflector, and a plurality of actuators coupled therebetween. The reflector has a light-receiving front surface, and a back surface facing the base. Each actuator includes a bracket rigidly bonded to the reflector at a perimeter of the reflector, and an inner rod and an outer rod. Each rod is rigidly connected between the bracket and the base, with the inner rod being closer to a center of the reflector. The length of each rod is temperature dependent. In another adaptive optic, the rods are instead bonded directly to the reflector. This adaptive optic may be modified to implement an integrally formed, thermally actuated support. The disclosed adaptive optics are suitable for use in laser systems, allow (Continued)

for significant cost savings over piezoelectric devices, provide a reflective area free of surface-figure perturbations caused by the actuator-interfaces, and are relatively simple to manufacture.

18 Claims, 14 Drawing Sheets

(56) References Cited

U.S. PATENT DOCUMENTS

| | | | |
|---|---|---|---|
| 7,771,065 B2* | 8/2010 | Sai | G02B 26/0825 359/224.1 |
| 7,813,033 B1* | 10/2010 | Blanding | G02B 6/4226 359/328 |
| 10,732,402 B2* | 8/2020 | Kwan | G02B 26/0825 |
| 2003/0147162 A1* | 8/2003 | Bennett | G02B 26/0825 359/849 |
| 2004/0017623 A1* | 1/2004 | Watson | G02B 7/182 359/849 |
| 2004/0036940 A1* | 2/2004 | Hazelton | G02B 26/0825 359/223.1 |
| 2005/0200984 A1* | 9/2005 | Browne | G02B 26/0825 359/872 |
| 2008/0117489 A1 | 5/2008 | Tanaka et al. | |
| 2008/0225370 A1 | 9/2008 | Mansell | |
| 2010/0202071 A1* | 8/2010 | Preumont | G02B 26/06 359/849 |
| 2011/0181851 A1* | 7/2011 | Schoeppach | G02B 7/1815 359/848 |
| 2013/0322471 A1* | 12/2013 | Rossbach | H01S 3/07 359/849 |

FOREIGN PATENT DOCUMENTS

| | | |
|---|---|---|
| CN | 112068307 A1 | 12/2020 |
| EP | 943947 A2 | 9/1999 |
| EP | 1376192 A2 | 1/2004 |
| JP | 4032134 B2 | 1/2008 |
| KR | 100570543 B1 | 4/2006 |
| WO | WO-2004088388 A1 | 10/2004 |
| WO | WO-2022106200 A1 | 5/2022 |

OTHER PUBLICATIONS

Vdovin et al., (2022). "Deformable mirror with thermal actuators," Optics Letters, 27(9):677-679, 2 pages.

Sporer et al., (2006). "TMT—Stressed Mirror Polishing Fixture Study," Proc. of SPIE, 6267, 13 pages.

West et al., (1994). "Practical design and performance of the stressed lap polishing tool," Applied Optics, 33:8094-8100.

* cited by examiner

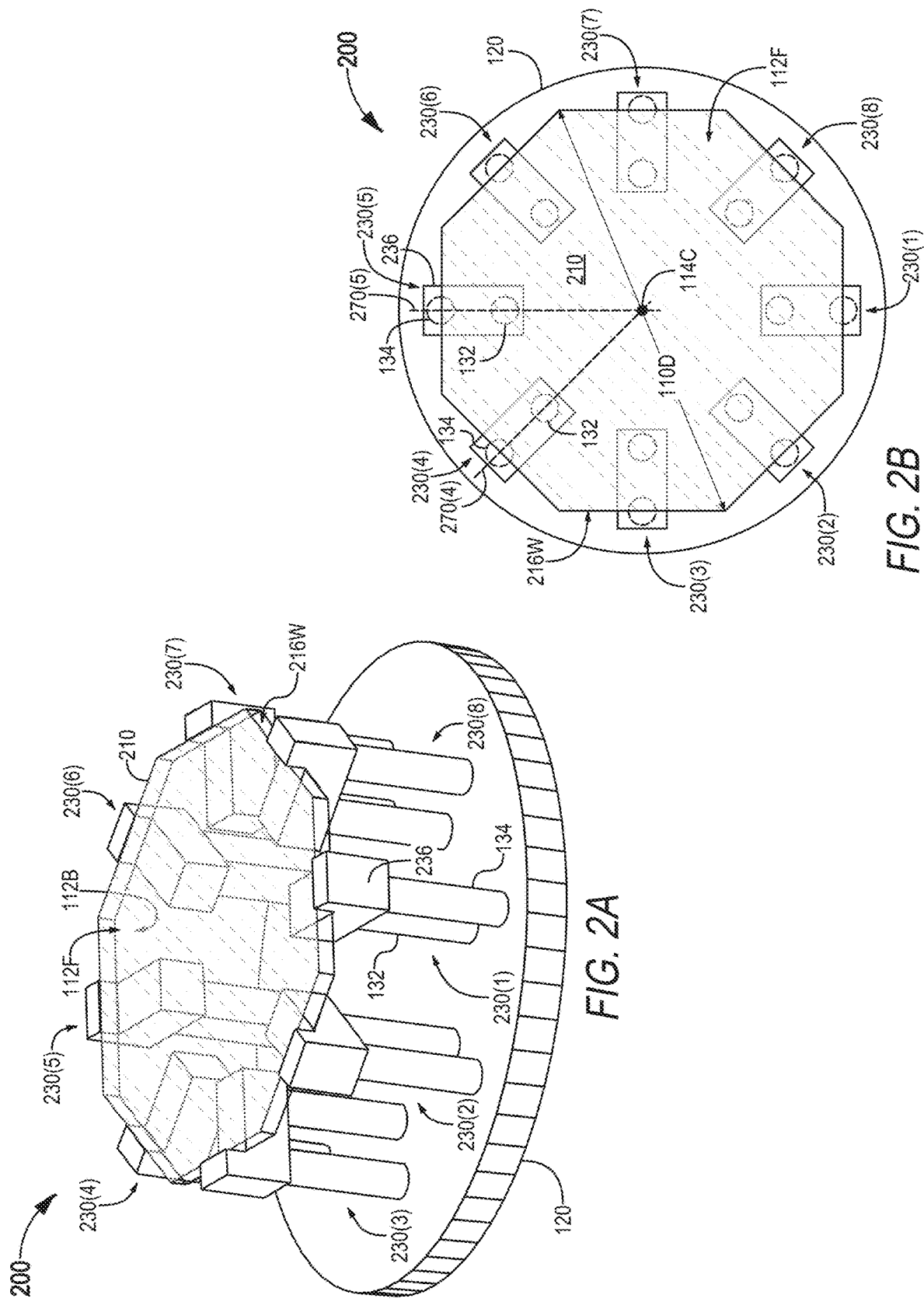

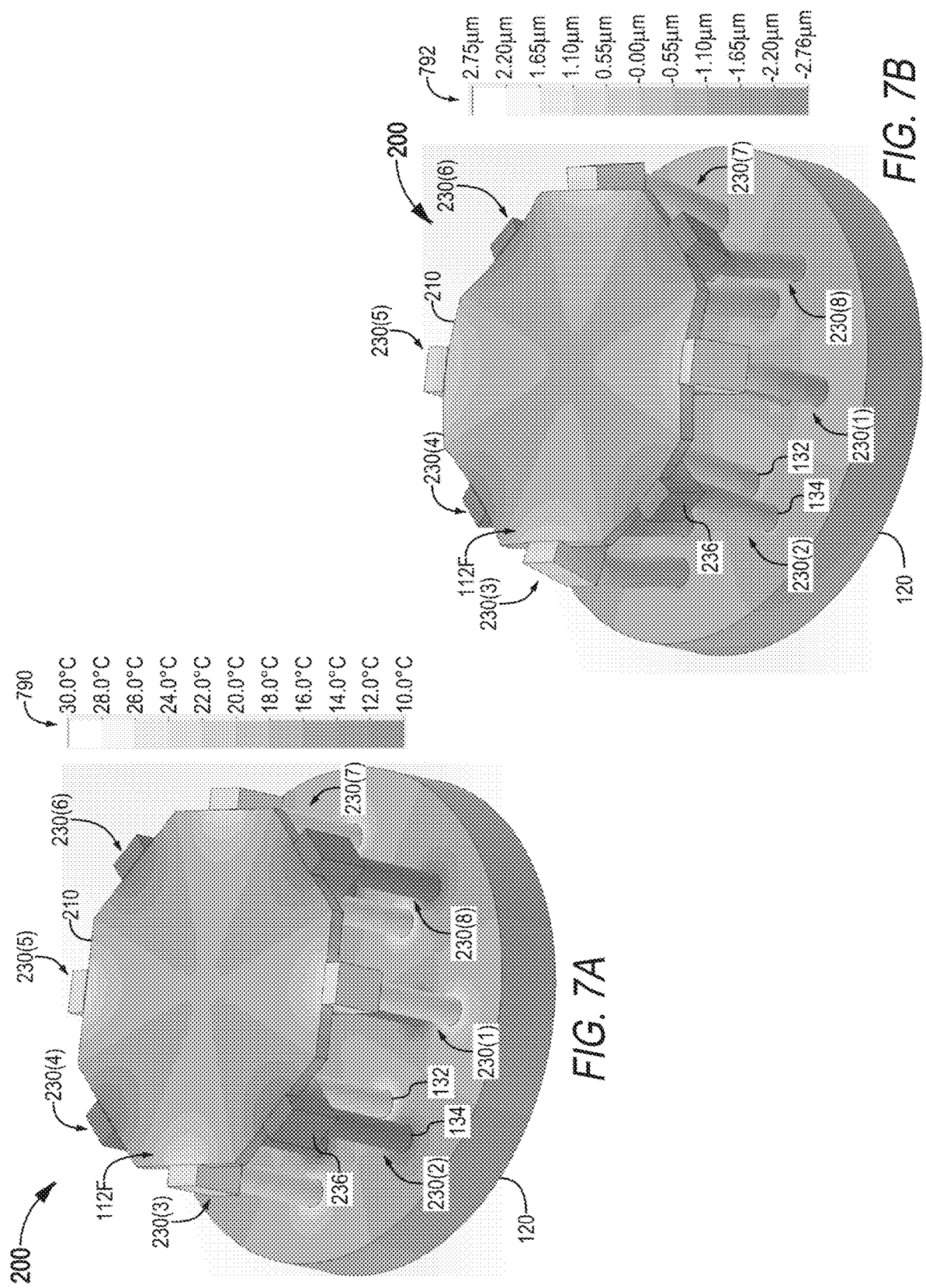

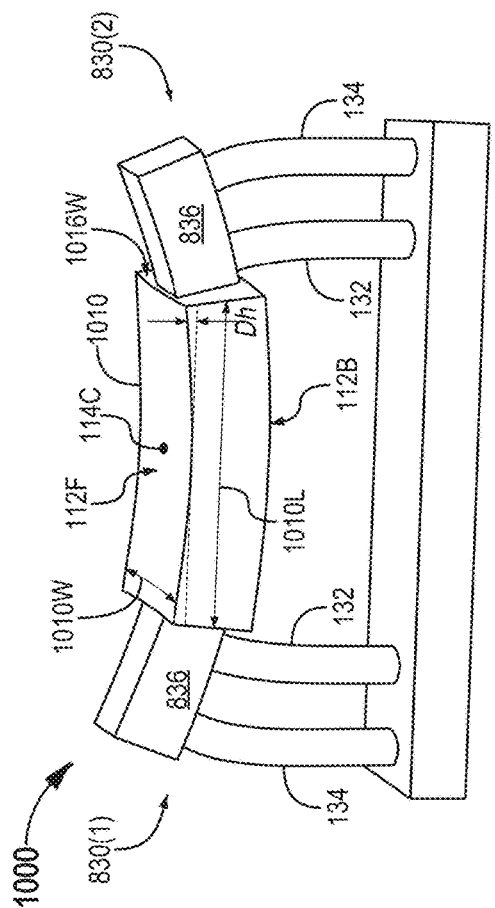
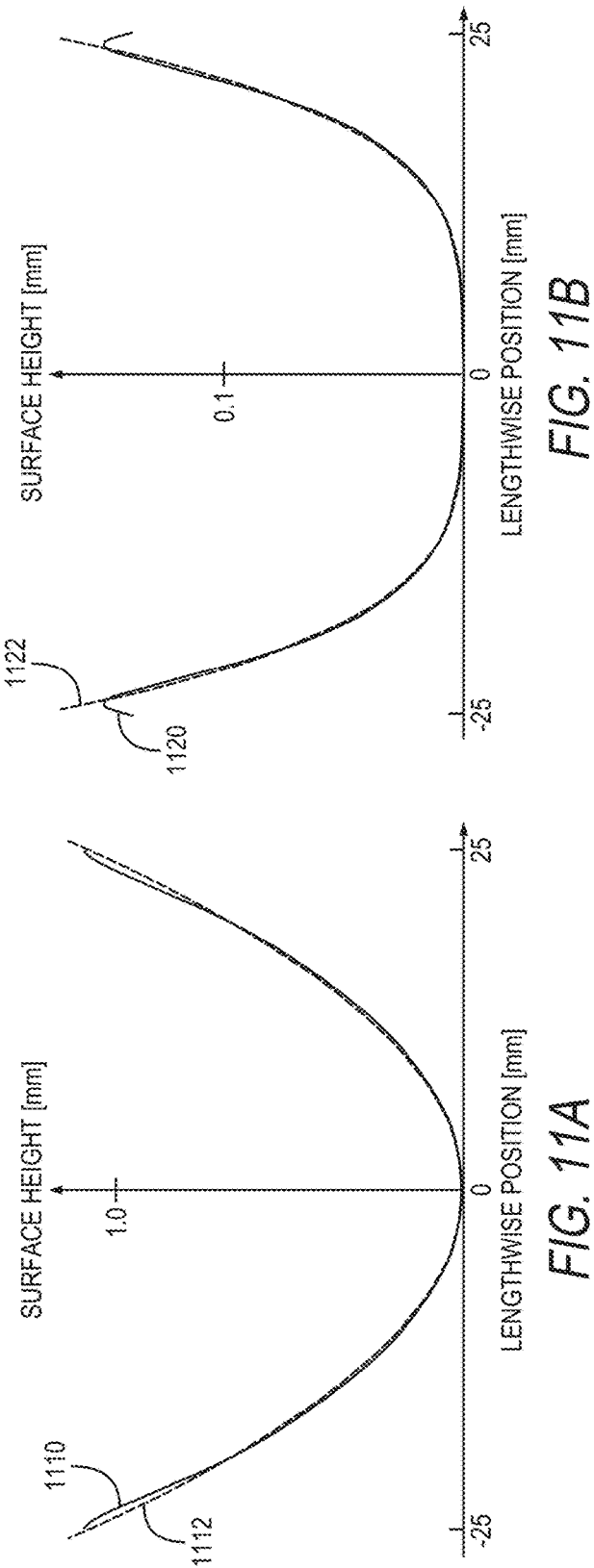

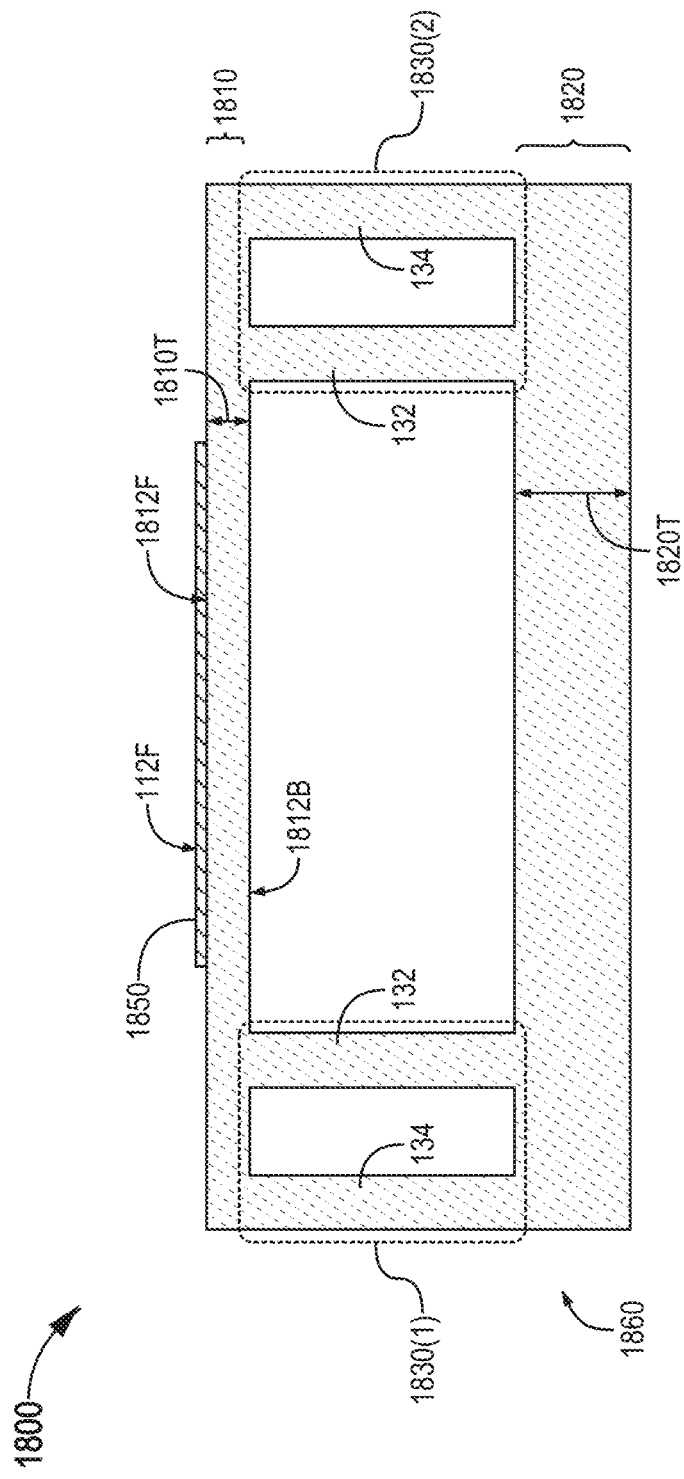

THERMALLY ACTUATED ADAPTIVE OPTICS

TECHNICAL FIELD OF THE INVENTION

The present invention relates in general to adaptive optics, in particular to thermally-actuated reflective, adaptive optics suitable for use in laser systems.

DISCUSSION OF BACKGROUND ART

Adaptive optics systems are used to manipulate the wavefront of a light field. Adaptive optics systems include one or more adaptive optical elements that can be adjusted to change the wavefront of a light field. For example, a deformable mirror may be deformed to impart a desired wavefront change on the reflected light. Similarly, a deformable lens may be deformed to impart a desired wavefront change on the transmitted light. Although open-loop operation is sufficient in some scenarios, adaptive optics systems typically incorporate an active-feedback loop wherein one or more adaptive optical elements are adjusted repeatedly according to measurements of the resulting wavefront.

Deformable mirrors may be continuous or segmented. In a segmented deformable mirror, the mirror surface consists of separate segments. Each such mirror-surface segment is non-deformable but, with individual actuation of each mirror-surface segment, the overall mirror surface is deformable. In a continuous deformable mirror, the mirror surface is continuous and has some degree of flexibility. An actuator array is positioned between the backside of the continuous mirror surface and a support substrate, to enable deformation of the continuous mirror surface. Continuous deformable mirrors with actuators that travel up to a few microns are commercially available.

Microelectromechanical systems (MEMS) technology has been used to manufacture continuous deformable mirrors. Such MEMS-based continuous deformable mirrors are typically assemblies of many separate parts, including an array of separate actuator structures that are controlled electrostatically or magnetically. In another category of continuous deformable mirrors, a piezoelectric wafer is attached to the backside of the mirror surface, and an array of electrodes controls local thicknesses of the piezoelectric wafer. Both MEMS-based and piezoelectric-wafer-based continuous deformable mirrors, designed for laser-beam wavefront correction, are now commercially available. These commercially available devices have a high number of actuators, typically tens of actuators or even more, arranged in a two-dimensional array to offer general-purpose and high-resolution wavefront control.

Zernike polynomials are an infinite series of polynomials that can be used to describe surface shapes. Zernike polynomials are often used in optics to describe mirror and lens surfaces, as well as wavefront surfaces and wavefront aberrations.

Adaptive optics systems were originally developed to correct for wavefront distortion caused by atmospheric turbulence, and many of the world's largest telescopes are equipped with segmented deformable mirrors to remove such wavefront distortion. Since their initial development, adaptive optics systems have found other uses. Adaptive optics systems are used to correct for time-varying wavefront distortion caused by imperfections in optical systems and/or environmental factors. Adaptive optics systems are also used to achieve wavefront properties that cannot, even under ideal circumstances, be achieved with conventional optical elements. Currently, adaptive optics systems are employed in a diverse range of technology fields including microscopy, retinal imaging, shaping of femtosecond laser pulses, optical communication, and astronomical imaging.

As the use of complex lasers is expanding beyond the scientific domain, the demand for turn-key, maintenance-free, high-performance laser systems is growing. Adaptive optics, especially in the form of adaptive mirrors, are emerging as a useful tool in the operation of complex lasers. Adaptive mirrors allow for hands-free adjustment of beam parameters within the laser system and may be used to, for example, automatically compensate for undesirable drift in beam parameters or deliberately change beam parameters as needed in a particular use scenario. The adjustment imparted by the adaptive optics may entail beam steering, focusing/defocusing, and/or higher-order wavefront manipulation.

SUMMARY OF THE INVENTION

Disclosed herein are thermally-actuated adaptive optics suitable for use in laser systems. The disclosed adaptive optics are reflective, in the form of either a mirror or a grating. The reflective surface is continuous, as opposed to segmented, and the adaptive optics are thus capable of handling high-intensity and high-fluence laser beams. Thermal actuation allows for significant cost savings, as compared to piezoelectric actuation, in situations where the required response time of the adaptive optic is commensurate with thermal equilibration time scales, typically about a minute or a few minutes.

In the disclosed adaptive optics, a reflector is supported by a base via two or more thermal actuators. The reflector is disposed in front of the base, with the thermal actuators connecting the reflector to the base. The thermal actuators are distributed along the perimeter of the reflector and are operated together to induce a desired tilt, tip, translation, and/or deformation of the reflector while leaving at least a substantially-sized central portion of the reflector free of local surface-figure perturbations caused by the interface with the actuators. In some embodiments, the actuators connect only to a sidewall of the reflector, thus maximizing the area of the reflector substantially free of local surface-figure perturbations. In other embodiments, the actuators connect to a back surface of the reflector, facing the base, at relatively peripheral locations so as to leave a central area substantially unaffected by local surface-figure perturbations.

Each thermal actuator includes two thermally expandable rods that nominally extend in a direction orthogonal to the reflector. The two rods can be operated in synchrony to extend or shorten the overall length of the actuator, thereby raising or lowering the portion of the reflector to which the actuator connects. Alternatively, the two rods can have different temperatures to induce a bending moment on the portion of the reflector to which the actuator connects, optionally with the average temperature of the two rods set to also extend or shorten the overall actuator length.

The presently disclosed actuator designs and configurations are compatible with optics in the size range down to a few millimeters and can induce complex shape deformation, without their manufacture requiring advanced micromachining or MEMS techniques.

In one aspect, a thermally actuated adaptive optic includes a base, a reflector, and a plurality of actuators. The reflector has a front surface for receiving incident light, and a back surface facing the base. The plurality of actuators are coupled between the base and the reflector. Each actuator includes a bracket rigidly bonded to the reflector at a perimeter of the reflector, and an inner rod and an outer rod. Each of the inner and outer rods is rigidly connected to and joining the bracket and the base. The inner rod is closer than the outer rod to a center of the reflector. The length of each rod between the bracket and the base is temperature dependent.

In another aspect, a thermally actuated adaptive optic includes a base, a reflector, and a plurality of actuators. The reflector has a front surface for receiving incident light, and a back surface facing the base. The plurality of actuators are distributed along a perimeter of the reflector and connect the base and the reflector. Each actuator includes an inner rod rigidly connected between the base and the back surface, and an outer rod rigidly connected between the base and the back surface. Each rod is rigidly bonded to the back surface. The inner rod is closer than the outer rod to a center of the reflector. The length of each rod between the reflector and the base is temperature dependent.

In yet another aspect, a thermally actuated adaptive optic includes a reflector, a base, and an integrally formed support. The integrally formed support includes a platform and a plurality of actuators. The platform has a front surface on which the reflector is disposed, and a back surface facing the base. The plurality of actuators connect the base and the platform. Each actuator includes (a) an inner rod connecting the base and the platform, and (b) an outer rod connecting the base and the platform. The inner rod is closer than the outer rod to a center of the platform. The length of each rod between the platform and the base is temperature dependent.

BRIEF DESCRIPTION OF THE DRAWINGS

The accompanying drawings, which are incorporated in and constitute a part of the specification, schematically illustrate preferred embodiments of the present invention, and together with the general description given above and the detailed description of the preferred embodiments given below, serve to explain principles of the present invention.

FIGS. 2A and 2B illustrate an adaptive optic with sidewall mounted thermal actuators disposed partially within the footprint of a reflector of the adaptive optic, according to an embodiment.

FIGS. 7A and 7B show modeling results in a complex-deformation-scenario of the same adaptive optic studied in FIGS. 5A and 5B.

FIG. 10 illustrates a thermally actuated adaptive optic that is deformable in one dimension, according to an embodiment.

FIGS. 11A and 11B show modeling results for two different aspheric deformations of a reflector in one example of the FIG. 10 adaptive optic.

FIG. 18 illustrates an adaptive optic with an integrally formed, thermally actuated support, according to an embodiment.

DETAILED DESCRIPTION OF THE INVENTION

Figure 1:
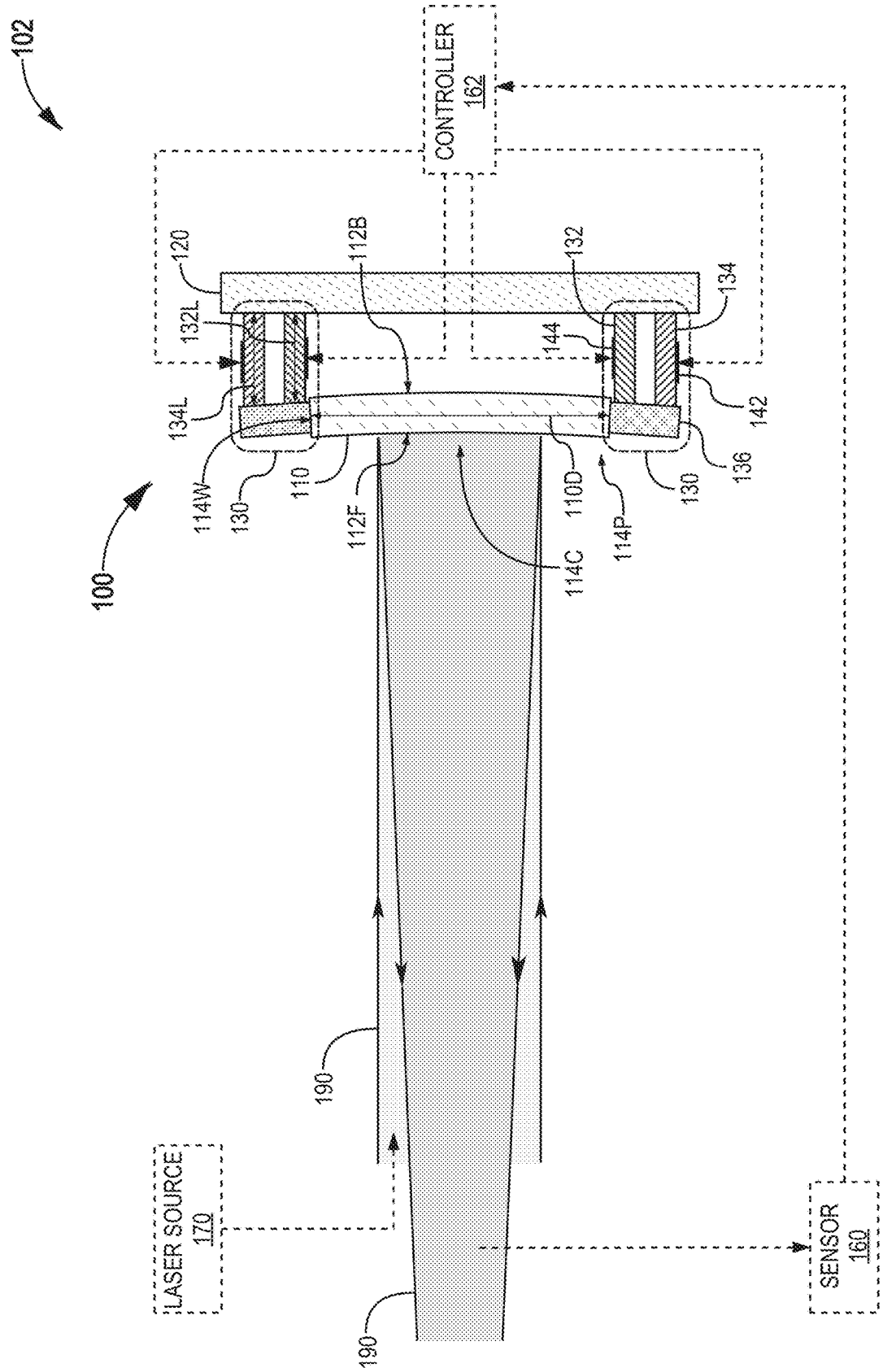
FIG. 1 illustrates a thermally actuated adaptive optic, according to an embodiment.

Referring now to the drawings, wherein like components are designated by like numerals, FIG. 1 illustrates one thermally actuated adaptive optic 100. Adaptive optic 100 includes a reflector 110, a base 120, and a plurality of thermal actuators 130 coupled between reflector 110 and base 120. Base 120 supports reflector 110 via actuators 130. Although FIG. 1 depicts only two actuators 130, adaptive optic 100 may include more than two actuators 130, for example between four and eight actuators 130. Reflector 110 has a front surface 112F and a back surface 112B. Back surface 112B faces base 120. In operation, front surface 112F receives light 190 to be reflected by reflector 110. Incident light 190 may be a laser beam. Reflector 110 may be reflective at front surface 112F (as depicted in FIG. 1), at back surface 112B, or at an interior location in reflector 110. Thermal manipulation of actuators 130 adjusts how reflection by adaptive optic 100 affects light 190.

Reflector 110 may be, or include, a substrate with a reflective dielectric or metal coating. The substrate may be made of glass. Alternatively, reflector 110 may be, or include, a metal substrate with a polished, reflective surface. In either case, the reflective surface or layer of reflector 110 may form a mirror or a grating.

In the example depicted in FIG. 1, reflector 110 is nominally planar, that is, reflector 110 is planar in its relaxed state when actuators 130 are inactive. However, reflector 110 may be nominally non-planar, without departing from the scope hereof. In one embodiment, reflector 110 is a glass substrate with a reflective coating forming front surface 112F. Reflector 110 may be a standard circular optic. Alternatively, the shape of reflector 110 may be non-circular, for example rectangular, octagonal, or another polygonal shape. In certain embodiments suitable for manipulation of laser beams, the maximum transverse extent 110D (e.g., diameter) of reflector 110 is in the range between 6 and 100 millimeters (mm).

Each actuator 130 includes an inner rod 132, an outer rod 134, and a bracket 136. Bracket 136 is rigidly bonded to reflector 110 at a perimeter 114P thereof. Each of rods 132 and 134 is rigidly connected to each of bracket 136 and base 120, such that bracket 136 and base 120 are joined via each of rods 132 and 134. Inner rod 132 is closer than outer rod 134 to a center 114C of reflector 110. Rods 132 and 134 are made of a thermally expandable material, such that the length of each of rods 132 and 134 between base 120 and bracket 136 is temperature dependent. Manipulation of the temperatures of rods 132 and 134 may therefore be used to impart tilting, tipping, translation, and/or deformation of reflector 110.

Operation of adaptive optic 100 requires that base 120 is rigid, or at least significantly more rigid than reflector 110, such that, when actuators 130 are operated to deform reflector 110, base 120 remains un-deformed or base 120 is deformed only to a much smaller degree than reflector 110. In one embodiment, base 120 is intrinsically rigid by design. In another embodiment, base 120 is not sufficiently rigid by itself but instead gains rigidity by being mounted to another more rigid structure (e.g., a supporting table).

Preferably, each inner rod 132 is a single integrally formed piece and, similarly, each outer rod 134 is a single integrally formed piece. In one embodiment, rods 132 and 134 are made of metal, for example stainless steel, aluminum, or an aluminum alloy. Rods 132 and 134 may, at least nominally, be substantially orthogonal to back surface 112B of reflector 110. Rods 132 and 134 may be identical. The nominal values of the respective lengths 132L and 134L of rods 132 and 134 may be chosen according to the desired dynamic range of extension of rods 132 and 134. In one example, the nominal length of each of rods 132 and 134 is in the range between 5 and 30 mm. The transverse dimensions of rods 132 and 134, orthogonal to lengths 132L and 134L, may be in the range between 10 and 50 percent of the corresponding length. Rods 132 and 134 may have a circular or rectangular cross section.

For each rod 132 and 134, the rigid connections to bracket 136 and base 120 may be achieved through the use of mechanical fastening hardware such as screws or heat shrinking, or through bonding techniques such as gluing, welding, or brazing. In one embodiment, rods 132 and 134 are glued to base 120 and bracket 136, for example by an epoxy adhesive. As compared to using mechanical fastening hardware, glue-mediated connections are typically cheaper and better suited for compact systems, e.g., wherein rods 132 and 134 have small diameters. On the other hand, screw-mediated connections can be stronger than glue-mediated connections. With respect to stability of the connections in the presence of temperature swings, screw-mediated connections may suffer from any mismatch between the coefficient of thermal expansion (CTE) of the screws and the material of the parts connected by the screws. However, screw-mediated connections may be preferred over glue-mediated connections when the parts connected have dissimilar CTEs. Welding and brazing are capable of providing strong, reliable connections but their implementation may be more cumbersome.

In certain implementations, each actuator 130 further includes thermal elements 142 and 144 thermally coupled to or within rods 132 and 134, respectively. Thermal elements 142 and 144 are operated to heat or cool rods 132 and 134, respectively, to achieve a desired length thereof. In one embodiment, each thermal element 142 and 144 is capable of both heating and cooling. For example, each thermal element 142 and 144 may be a Peltier device. In another embodiment, thermal elements 142 and 144 have heating functionality only and may be resistive heaters.

In the example depicted in FIG. 1, thermal elements 142 and 144 of each actuator 130 are operated to elevate the temperature of outer rod 134 over that of inner rod 132, such that length 134L of outer rod 134 exceeds length 132L of inner rod 132. This length discrepancy causes bracket 136 of each actuator to induce a bending moment on reflector 110. Actuators 130 thereby cooperate to deform reflector 110 such that light 190 is exposed to a concave shape upon reflection by adaptive optic 100. As a result, adaptive optic 100 focuses light 190. In another example, not depicted in FIG. 1, thermal elements 142 and 144 of each actuator 130 are operated in synchrony to thermally expand each inner rod 132 and each outer rod 134 by the same amount, so as to translate reflector 110 in the direction away from base 120. Generally, thermal elements 142 and 144 of actuators 130 of adaptive optic 100 may be operated to translate, tip, tilt, and/or deform reflector 110.

In one alternative implementation, not all rods 132 and 134 are equipped with thermal elements. For example, adaptive optic 100 may include only thermal elements 142 and not thermal elements 144, or vice versa, such that, for each actuator 130, one of rods 132 and 134 is active (i.e., its length is thermally controlled by a thermal element) and the other one of rods 132 and 134 is passive. The functionality of this implementation is limited, as compared to implementations of adaptive optic including thermal elements 142 and 144. For example, it is not possible to purely translate reflector 110 away from or toward base 120. On the other hand, this implementation is simpler and may suffice in some scenarios, such as when only certain types of deformation are needed.

In another alternative implementation, adaptive optic 100 is provided without thermal elements 142 and 144. In this implementation, a user may add thermal elements 142 and/or 144 as needed, or adaptive optic 100 may be integrated in a system that provides thermal elements 142 and/or 144 as needed.

In some conventional deformable mirrors, an array of actuators is coupled to the backside of the mirror within the clear aperture of the mirror. In such conventional deformable mirrors, the local surface shape of the mirror right at the interface with each actuator is restricted by the interface geometry itself. Typically, the interface is planar such that the mirror itself remains at least nearly planar within the area of the interface regardless of which overall deformation may be applied to the mirror as a whole. This may prevent a smooth deformation such as the one depicted in FIG. 1. Each actuator in this conventional deformable mirror imparts a local surface-figure perturbation. Adaptive optic 100 avoids or at least minimizes this issue by coupling actuators 130 only to perimeter 114P of reflector 110, with actuators 130 leveraging perimeter 114P to manipulate the shape (e.g., surface-figure), orientation, and/or position of reflector 110 inside perimeter 114P. In the embodiment depicted in FIG. 1, brackets 136 are bonded only to the sidewall 114W of reflector 110, to maximize the area of reflector 110 free of local surface-figure perturbations imposed by actuators 130. Perimeter 114P is however not restricted to sidewall 114W of reflector 110, but may include a peripheral portion of reflector 110 surrounding a more central region of reflector 110. Thus, without departing from the scope hereof, brackets 136 may be bonded to relatively peripheral portions of back surface 112B, optionally in conjunction with being bonded to sidewall 114W. Although bonding of brackets 136 to back surface 112B at perimeter 114P of reflector 110 may reduce the useable clear aperture of adaptive optic 100, as compared to bonding of brackets 136 only to sidewall 114W, this may be preferable in some situations.

FIG. 1 shows adaptive optic 100 as implemented in an apparatus 102 configured with active-feedback control of adaptive optic 100. Apparatus 102 includes adaptive optic 100, a sensor 160, and a controller 162. Sensor 160 probes light 190 after reflection by adaptive optic 100, and controller 162 adjusts heating/cooling by thermal elements 142 and/or 144 according to measurements obtained by sensor 160. Sensor 160 may be configured to measure a property of light 190 that is indicative of its focusing properties, transverse extent, pointing direction, other wavefront properties, or power, for example. Without departing from the scope hereof, other optical elements (not shown in FIG. 1) may manipulate light 190 between adaptive optic 100 and sensor 160. In one implementation apparatus 102 is a laser apparatus, or part of a laser apparatus, that (a) further includes a laser source 170 generating light 190 in the form of a laser beam or (b) or receives such a laser beam from laser source 170.

In the example depicted in FIG. 1, base 120 is a planar structure, e.g., a planar substrate. Without departing from the scope hereof, base 120 may have a different and possibly more complex shape. For example, base 120 may have selectively located holes to reduce its thermal conductivity. Base 120 may be made of metal. Alternatively, base 120 may be made of a material with lower thermal conductivity, such as glass, in order to reduce thermal crosstalk between actuators 130 and especially between rods 132 and 134 of the same actuator 130.

Brackets 136 may be made of metal. In one embodiment, brackets 136 and rods 132 and 134 are made of the same type of metal. In this embodiment, bracket 136 and rods 132 and 134 of each actuator 130 may be a single integrally formed part. In another embodiment, brackets 136 are made of a metal with lower thermal conductivity than rods 132 and 134. Brackets 136 may have hollows to reduce thermal crosstalk between rods 132 and 134 of each actuator 130 via bracket 136. In yet another embodiment, brackets 136 are ceramic or made of glass.

Figure 4:
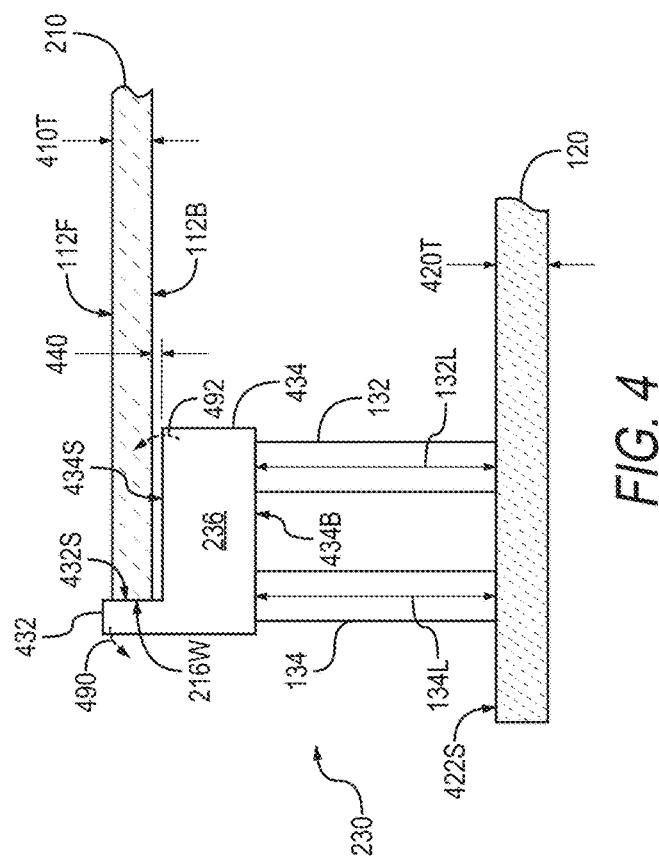
FIG. 4 is a more detailed side-view of the thermal actuator of the adaptive optic of FIGS. 2A and 2B.
Figure 3:
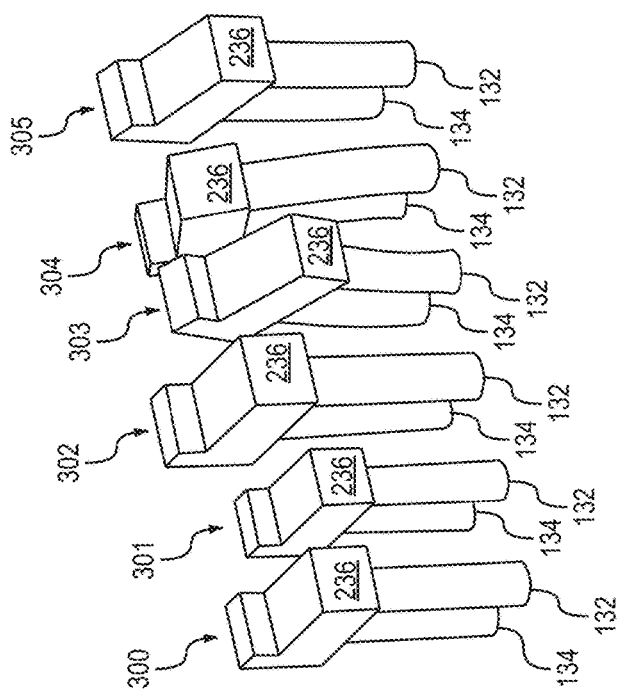
FIG. 3 shows examples of states of the thermal actuator of the adaptive optic of FIGS. 2A and 2B that can be achieved by thermal manipulation thereof.

FIGS. 2A, 2B, 3, and 4 illustrate one adaptive optic 200 with side-wall mounted thermal actuators. Adaptive optic 200 is an embodiment of adaptive optic 100, wherein each actuator is disposed partially within the footprint of the reflector while being bonded only to the sidewall thereof. FIG. 2A is a perspective view of adaptive optic 200, and FIG. 2B is a top-view of adaptive optic 200. In adaptive optic 200, a reflector 210 is coupled to base 120 via a plurality of thermal actuators 230. Reflector 210 and actuators 230 are embodiments of reflector 110 and actuators 130, respectively, and may have material compositions as discussed above in reference to FIG. 1. FIG. 3 shows different states of thermal actuator 230 that can be achieved by thermal manipulation thereof. FIG. 4 is a more detailed side-view of thermal actuator 230 and its arrangement in adaptive optic 200.

Reflector 210 has a sidewall 216W that connects the perimeters of front surface 112F and back surface 112B and surrounds center 114C (see FIGS. 2A and 2B). Actuators 230 are distributed along sidewall 216W and about center 114C. Each actuator 230 includes inner rod 132 and outer rod 134, and a bracket 236. Bracket 236 is an embodiment of bracket 136 and is rigidly bonded to sidewall 216W.

As shown in FIG. 4, each bracket 236 is L-shaped. One leg 432 of the "L" has a surface 432S that is rigidly bonded to sidewall 216W. The other, orthogonal leg 434 of the "L" extends along back surface 112B in the direction toward center 114C, such that at least inner rod 132 is within the footprint of reflector 210. Leg 434 is not bonded to back surface 112B. This geometry of brackets 236 (a) maximizes the area of reflector 210 that is free from local surface-figure perturbations imparted by actuators 230 and (b) positions actuators 230 at least partly within the footprint of reflector 210 to facilitate compactness of adaptive optic 200.

Although not shown in FIGS. 2A, 2B, 3, and 4, each actuator 230 may include one or both of thermal elements 142 and 144, as discussed above in reference to FIG. 1. For each actuator 230, the position and orientation of bracket 236 may be changed by adjusting the temperature of rods 132 and 134. FIG. 3 shows exemplary states 300, 301, 302, 303, 304, and 305 of actuator 230. State 300 is a nominal state of actuator 230, wherein the temperature of rods 132 and 134 are identical, and rods 132 and 134 have the same length. In one example of nominal state 300, rods 132 and 134 are at ambient temperature, e.g., around 20 degrees Celsius. FIG. 4 provides a side-view of actuator 230 when in nominal state 300. In state 301, both of rods 132 and 134 are shortened by cooling to the same reduced temperature, such that bracket 236 is positioned closer to base 120 but has the same orientation as in nominal state 300. (In implementations where thermal elements 142 and 144 have no cooling functionality, nominal state 300 may correspond to rods 132 and 134 being at a temperature that is relatively centered in the temperature range achievable by heating with thermal elements 142 and 144, and state 301 may correspond to rods 132 and 134 being at the cooler end of this achievable temperature range.) In state 302, both of rods 132 and 134 are heated to the same elevated temperature, such that bracket 236 is positioned farther from base 120 but has the same orientation as in nominal state 300. In state 303, the temperature of outer rod 134 exceeds that of inner rod 132, and the resulting length discrepancy forces bracket 236 to tilt inwards (toward center 114C). The opposite scenario is found in state 304 where the temperature of inner rod 132 exceeds that outer rod 134, and the resulting length discrepancy forces bracket 236 to tilt outwards (away from center 114C). The translation achieved in states 301 and 302 may be combined with the tilting achieved in states 303 and 304. For example, in state 305, both of rods 132 and 134 are at an elevated temperature with the temperature of outer rod 134 exceeding that of inner rod 132. Therefore, in state 305, bracket 236 is both tilted and displaced from base 120, as compared to nominal state 300.

The above description of states 300, 301, 302, 303, 304, and 305 ignores the indirect mechanical coupling between actuators 230 through reflector 210. Due to this indirect mechanical coupling, the physical shape of one actuator 230 may be determined not only by the temperatures of its rods 132 and 134, but also by the actuation imparted by other actuators 230.

In certain embodiments, base 120 is significantly more rigid than reflector 210. In one such embodiment, base 120 is a solid substrate with a thickness 420T that exceeds the thickness 410T of reflector 210. In another such embodiment, base 120 is made of a stiffer material than reflector 210, or base 120 has mechanical design features that add rigidity.

In one implementation of adaptive optic 200, suitable for use in a laser apparatus and capable of deforming reflector 210, maximum transverse extent 110D is in the range between 6 and 100 mm and thickness 410T is in the range between about 1 and 5 mm.

A gap 440 separates leg 434 from back surface 112B (see FIG. 4). Gap 440 accommodates outward tilting of bracket 236 (see state 304 of actuator 230 in FIG. 3). When length 132L of inner rod 132 is extended as compared to length 134L of outer rod 134, bracket 236 tilts as indicated by arrows 490 and 492. Gap 440 prevents the surface 434S of bracket 236, facing back surface 112B, from contacting and pushing against back surface 112B of reflector 210. In one example, gap 440 is sized to accommodate an outward tilt of bracket 236 of up to 10 or 15 degrees.

In the embodiment shown in FIGS. 2A and 2B, sidewall 216W is composed of planar segments such that brackets 236 can be bonded thereto with surfaces 432S being planar. In an alternative embodiment, sidewall 216W has a different shape and the shapes of surfaces 432S of actuators 230 are modified accordingly. For example, reflector 210 may be circular, and surfaces 432S rounded to match the curvature of sidewall 216W.

The example of adaptive optic 200 shown in FIGS. 2A and 2B is equipped with eight actuators 230. More generally, adaptive optic 200 may have two or more actuators 230. The number of actuators 230 needed depends on the functionality desired. For example, four actuators 230 enable tipping and tilting (i.e., rotation about two orthogonal axes) of reflector 210. When each actuator 230 is oriented such that its rods 132 and 134 are centered on a line 270 that passes through center 114C of reflector 210 (see FIG. 2B), four actuators 230 can produce spherical-figure deformation of reflector 210 as well. However, when the required functionality includes aspheric surface deformation and/or surface deformation characterized by higher-order Zernike modes, it may be necessary or at least preferable that adaptive optic 200 includes at least eight actuators 230.

Figures 5A, 5B:
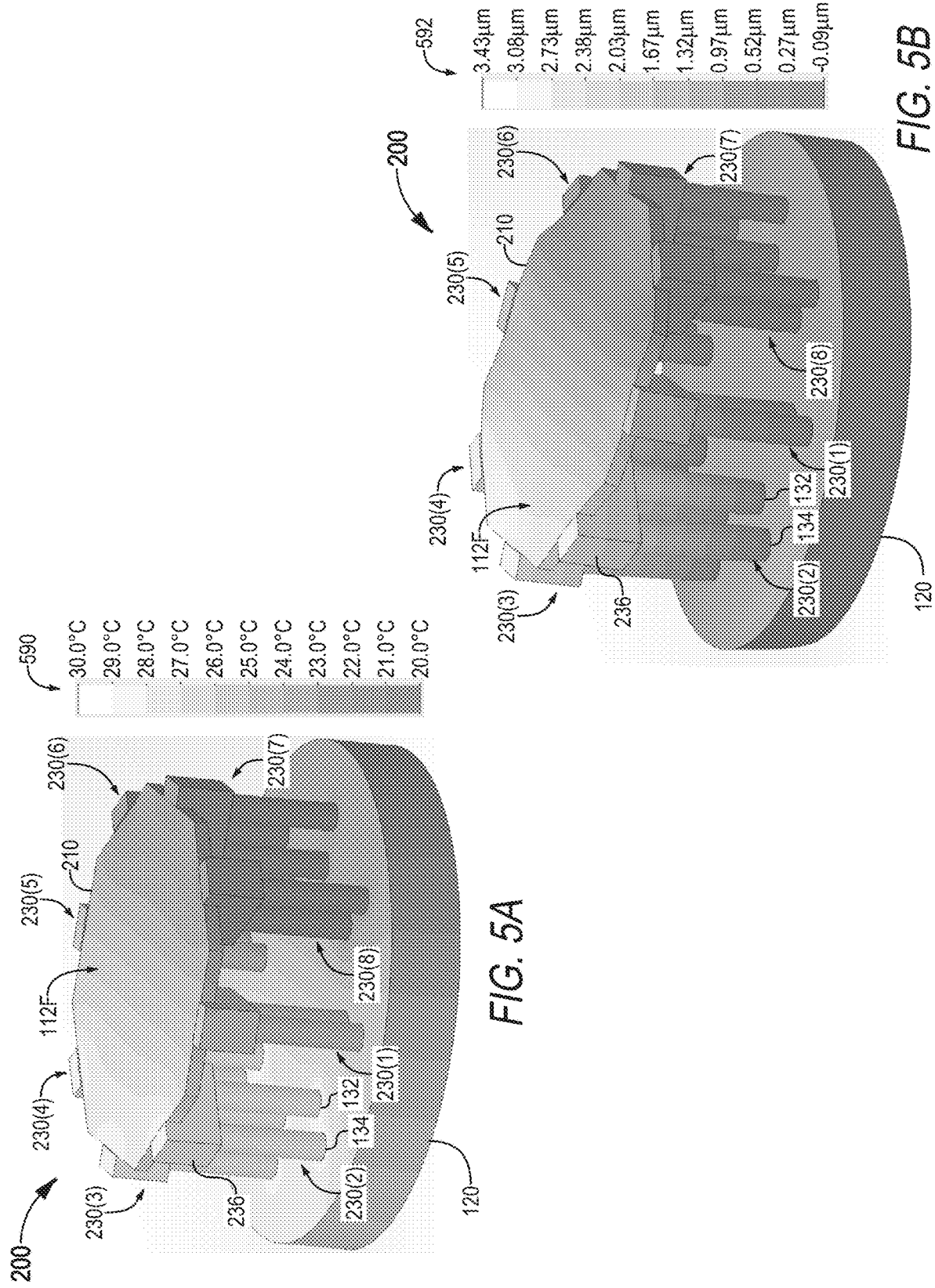
FIGS. 5A and 5B show modeling results in a tipping-scenario of the adaptive optic of FIGS. 2A and 2B in an eight-actuator embodiment thereof.

FIGS. 5A and 5B show modeling results in a tipping-scenario of adaptive optic 200 in an eight-actuator embodiment similar to the one explicitly depicted in FIGS. 2A, 2B, and 4. FIG. 5A indicates the temperature distribution of adaptive optic 200 according to greyscale 590. FIG. 5B indicates the corresponding physical shape of adaptive optic 200 according to greyscale 592. Changes in the shape of adaptive optic 200 relative to its nominal shape are exaggerated for purposes of clarity.

The modeling assumes that brackets 236 are made of stainless steel 304, each rod 132 and 134 is made of aluminum 6061T6 and nominally cylindrical with a length of 10 mm and a diameter of 2 mm, and reflector 210 is an octagonal glass optic, made of fused silica, with a maximum transverse extent 110D of 25 mm and a thickness 410T of 1 mm. Inner rods 132 are positioned 9 mm from the center of reflector 210, and outer rods 134 are positioned 12.5 mm from the center of reflector 210. Base 120 is also made of fused silica, has a thickness 420T of 5 mm, and is assumed to be fixed at its bottom surface facing away from reflector 210. The modeling takes into account the thermal conductivity of rods 132 and 134, brackets 236, reflector 210, and base 120.

In this tipping-scenario, rods 132 and 134 of actuators 230(2-4) are at a temperature of 30 degrees Celsius, rods 132 and 134 of actuators 230(1) and 230(5) are at a temperature of 25 degrees Celsius, and rods 132 and 134 of actuators 230(6-8) are at a temperature of 20 degrees Celsius (see FIG. 5A). As a result, the end of reflector 210 bonded to actuators 230(2-4) is shifted away from base 120, thereby tilting reflector 210. The planarity of reflector 210 is mostly maintained, at least in a central region. The absolute displacement between the two opposite ends of reflector 210 is about 3.5 micrometers, and the tilt angle is about 140 microradians.

Ignoring the indirect mechanical inter-coupling of actuators 230 through reflector 210, the temperatures of rods 132 and 134 in this tipping-scenario correspond to actuators 230(1-5) being in extended state 302, and actuators 230(6-8) being in nominal state 300. However, as seen in FIG. 5B, the indirect mechanical inter-coupling of actuators 230 causes rods 132 and 134 to bend as well.

Figures 6A, 6B:
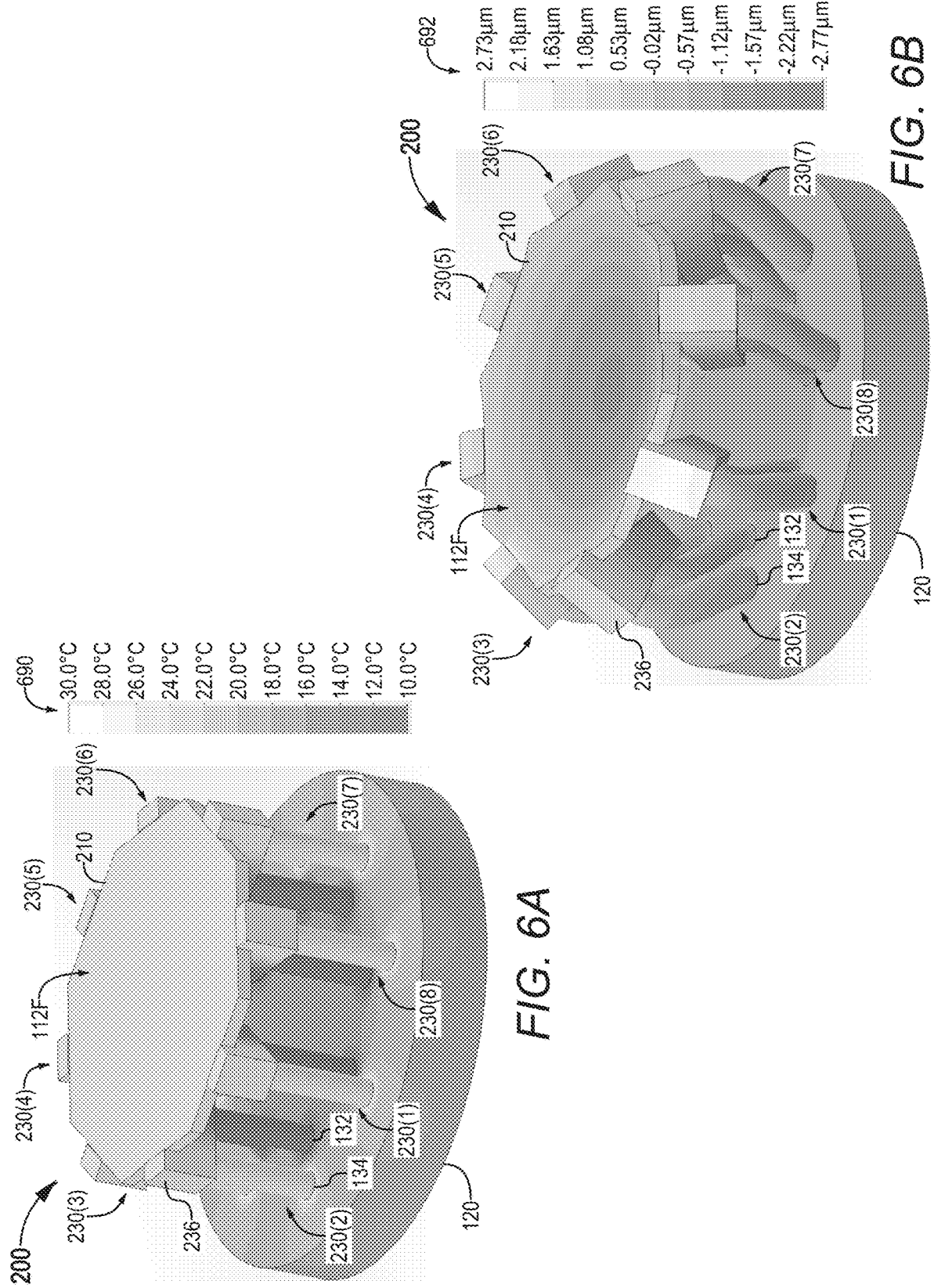
FIGS. 6A and 6B show modeling results in a focusing-scenario of the same adaptive optic studied in FIGS. 5A and 5B.

FIGS. 6A and 6B show modeling results in a focusing-scenario of the same embodiment of adaptive optic 200 studied in FIGS. 5A and 5B. FIG. 6A indicates the temperature distribution of adaptive optic 200 according to greyscale 690. FIG. 6B indicates the corresponding physical shape of adaptive optic 200 according to greyscale 692, with shape changes exaggerated for clarity.

In this focusing-scenario, each actuator 230 is operated in the same manner. The temperature of inner rod 132 is set to 10 degrees Celsius, and the temperature of outer rod 134 is set to 30 degrees Celsius. The resulting average temperature of each actuator 230 is therefore 20 degrees Celsius, and the temperature of reflector 210 is at least approximately uniform at 20 degrees Celsius. In this focusing-scenario scenario, each actuator 230 tilts its bracket 236 inwards, thus inducing a bending moment on reflector 210 resulting in front surface 112F being concave with a radius of curvature of about 25 meters.

FIGS. 7A and 7B show modeling results in a complex-deformation-scenario of the same embodiment of adaptive optic 200 studied in FIGS. 5A and 5B. FIG. 7A indicates the temperature distribution of adaptive optic 200 according to greyscale 790. FIG. 7B indicates the corresponding physical shape of adaptive optic 200 according to greyscale 792, with shape changes exaggerated for clarity.

In this complex-deformation-scenario, actuators 230 are operated to alternately tilt inward and outward. Specifically, each of actuators 230(1), 230(3), 230(5), and 230(7) is tilted inward by setting (a) the temperature of inner rod 132 to 10 degrees Celsius and (b) the temperature of outer rod 134 to 30 degrees Celsius, while each of actuators 230(2), 230(4), 230(6), and 230(8) is tilted outward by setting (a) the temperature of inner rod 132 to 30 degrees Celsius and (b) the temperature of outer rod 134 to 10 degrees Celsius. Actuators 230(1-8) thereby cooperate to deform reflector 210 in a manner that resembles Zernike polynomial $Z_{4,4}(r, \theta)$.

Referring again to FIGS. 3 and 4, the depicted embodiments of actuator 230 and the above discussion thereof assume that rods 132 and 134 have the same nominal length. Without departing from the scope hereof, nominal lengths of rods 132 and 134 may differ from each other, and the back surface 434B of bracket 236 and/or the supporting surface 422S of base 120 may or may not be non-planar to compensate for this length difference. Such a design may however add complexity to the thermal control of lengths of rods 132 and 134, since the absolute length change in response to a temperature change will be different for rods 132 and 134 (if they are made of the same material).

Figure 9:
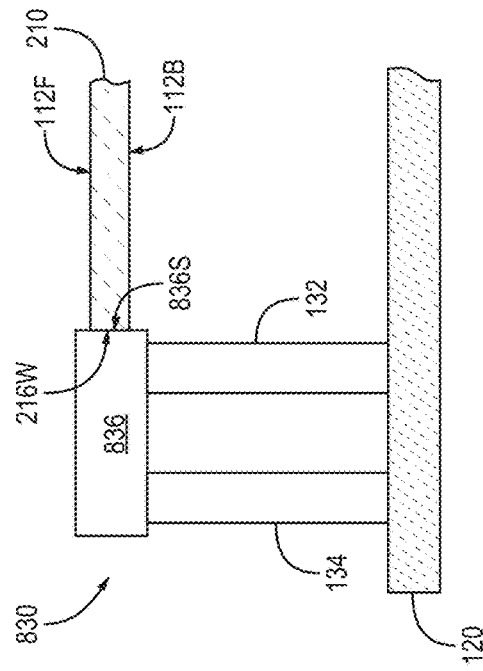
FIG. 9 is a more detailed side-view of an actuator of the adaptive optic of FIG. 8.
Figure 8:
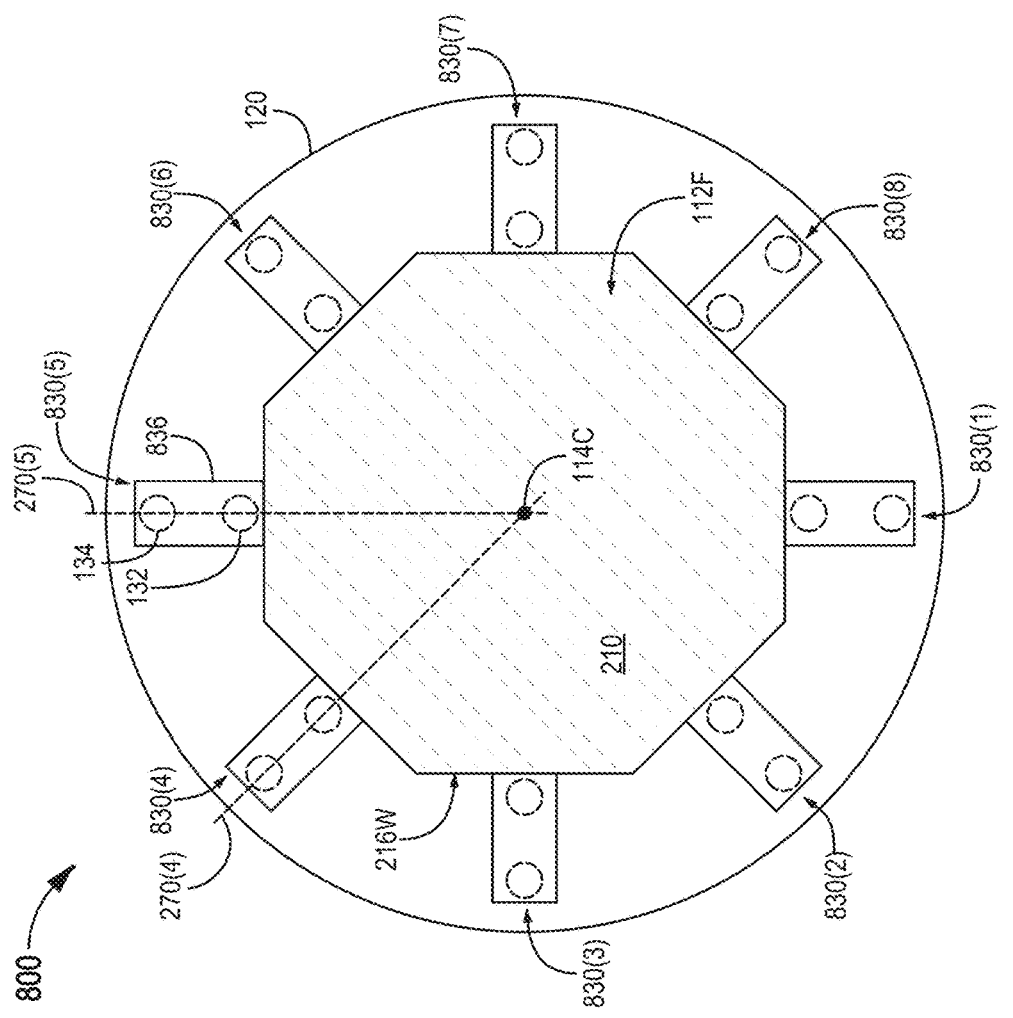
FIG. 8 is a top-view of another thermally actuated adaptive optic with side-wall mounted thermal actuators, according to an embodiment.

FIGS. 8 and 9 illustrate another thermally actuated adaptive optic 800 with side-wall mounted thermal actuators. FIG. 8 is a top-view of adaptive optic 800 (similar to the view of adaptive optic 200 provided by FIG. 2B), and FIG. 9 is a more detailed side-view of an actuator 830 of adaptive optic 800 and its arrangement in adaptive optic 800 (similar to the view of actuator 230 provided by FIG. 4). Adaptive optic 800 is similar to adaptive optic 200 except for being equipped with thermal actuator 830 arranged outside the footprint of reflector 210.

Each actuator 830 is a modification of actuator 230 that implements a bracket 836 instead of bracket 236. As shown in FIG. 9, bracket 836 is rigidly bonded to sidewall 216W and extends radially outward from reflector 210 (in the direction away from center 114C). Bracket 836 may be shaped as a cuboid, and may have material composition similar to that of bracket 236. As compared to actuator 230, actuator 830 may be simpler to manufacture and also potentially ease assembly of adaptive optic 800. For the same reflector size, adaptive optic 800 is, however, not as compact as adaptive optic 200.

FIG. 10 illustrates one thermally actuated adaptive optic 1000 that is deformable in one dimension. Adaptive optic 1000 is an embodiment of adaptive optic 800 configured with two actuators 830 rigidly bonded to a reflector 1010. Reflector 1010 is an embodiment of reflector 210 that is nominally planar and has two planar sidewall portions 1016W at opposite ends thereof. Sidewall portions 1016W are a distance 1010L apart from each other. (One of the two sidewall portions 1016W is hidden from view in FIG. 10.) Each of the two actuators 830 is bonded to a respective one of sidewall portions 1016W.

In one implementation, reflector 1010 is rectangular in shape, with orthogonal width 1010W and length 1010L and with actuators 830 bonded to reflector 1010 at two opposite ends of the lengthwise dimension.

FIG. 10 depicts adaptive optic 1000 in a deformed state where outer rods 134 of both actuators 830 are thermally extended, relative to inner rods 132, such that each bracket 836 is tilted inwards. As a result, front surface 112F is concave, back surface 112B is convex, and adaptive optic 1000 has a focusing effect on incident light 190. If, instead, inner rods 132 are thermally extended relative to outer rods 134, brackets 836 are tilted outwards and adaptive optic will have a defocusing effect on incident light 190.

FIGS. 11A and 11B show modeling results for two different aspheric deformations of reflector 1010 in one example of adaptive optic 1000. In this example, reflector 1010 is a glass substrate with a reflective coating, length 1010L is 50 mm, width 1010W is 25 mm, and the thickness of reflector 1010 in the dimension orthogonal to length 1010L and width 1010W is 12 mm. Each of FIGS. 11A and 11B plots the height of front surface 112F (indicated as $\Delta h$ in FIG. 10) as a function of the lengthwise position (x). The origin for measuring both surface height and lengthwise position is center 114C.

In the FIG. 11A scenario, outer rods 134 are thermally extended relative to inner rods 132 so as to achieve a nearly perfect parabolic surface figure. Curve 1110 shows the modeled surface profile for front surface 112F, and curve 1112 is a pure parabola ($\Delta h \propto x^2$) for comparison. Although deviations from a perfect parabolic profile of front surface 112F are observed, these deviations are relatively minor, especially in the central 75% of the position range.

In the FIG. 11B scenario, outer rods 134 are again thermally extended relative to inner rods 132, but the length discrepancy is greater than the length discrepancy resulting in the FIG. 11A deformation. The greater bending moment on reflector 1010, resulting from the greater length discrepancy in the present scenario, induces a fourth-order, aspheric deformation substantially of the form $\Delta h \propto x^4$. Curve 1120 shows the modeled surface profile for front surface 112F, and curve 1122 is an exact $\Delta h \propto x^4$ relationship for comparison. Minor deviations are observed, but substantial deviations are found only at the very ends of reflector 1010 near actuators 830.

FIGS. 11A and 11B demonstrate that deformation of reflector 1010 in adaptive optic 1000 can be controlled to achieve certain aspheric surface profiles to a high accuracy. The achievable surface profiles are not limited to the ones shown in FIGS. 11A and 11B. For example, while the deformations investigated in FIGS. 11A and 11B are of even order ($2^{nd}$ and $4^{th}$ order), it is also possible to induce odd-order aspheric deformation.

Figure 12:
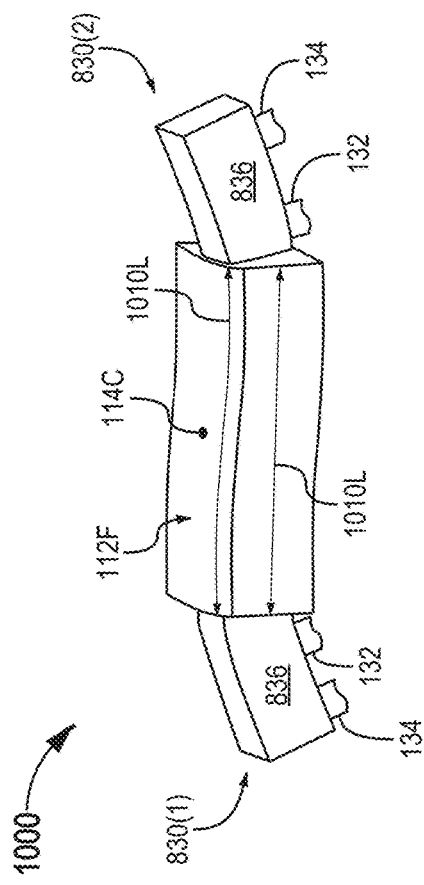
FIG. 12 shows a portion of the FIG. 10 adaptive optic with an odd-order aspheric deformation of the reflector.

FIG. 12 is a partial view of adaptive optic 1000 with an odd-order aspheric deformation of reflector 1010. In this scenario, rods 132 and 134 of one actuator 830(1) are thermally actuated to tilt the corresponding bracket 836 outward, while rods 132 and 134 of the other actuator 830(2) are thermally actuated to tilt the corresponding bracket 836 inward. This thermal actuation results in a deformation of front surface 112F (and back surface 112B) that at least contains an odd-order aspheric component.

Figure 13:
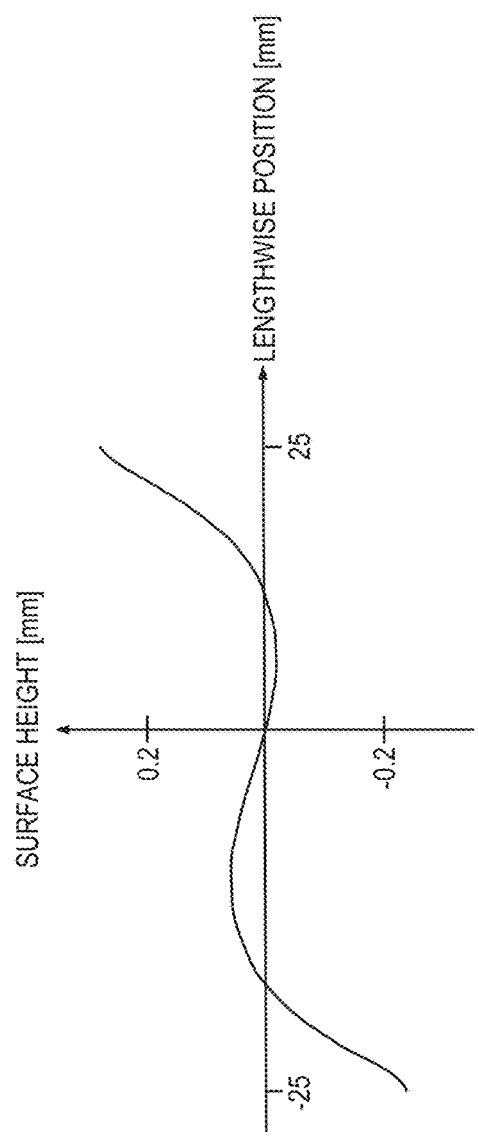
FIG. 13 shows modeling results for an odd-order aspheric deformation of the reflector of an example of the FIG. 10 adaptive optic.

FIG. 13 shows modeling results for one odd-order aspheric deformation of front surface 112F of reflector 1010 in adaptive optic 1000. The results shown in FIG. 13 pertain to the same example of adaptive optic 1000 as investigated in FIGS. 11A and 11B, when actuators 830 are controlled as illustrated in FIG. 12. As evident from FIG. 13, the resulting surface height has a strong $\Delta h \propto x^3$ component.

Without departing from the scope hereof, and without substantially altering performance, adaptive optic 1000 may utilize actuators 230 instead of actuators 830. Additionally, adaptive optic 1000 may include additional actuators 830 or 230 rigidly bonded to other sidewall portions of reflector 1010 along its lengthwise dimension to help induce a desired deformation. While such additional actuators may aid deformation in a more direct manner, local surface-figure perturbations may arise.

Figure 14:
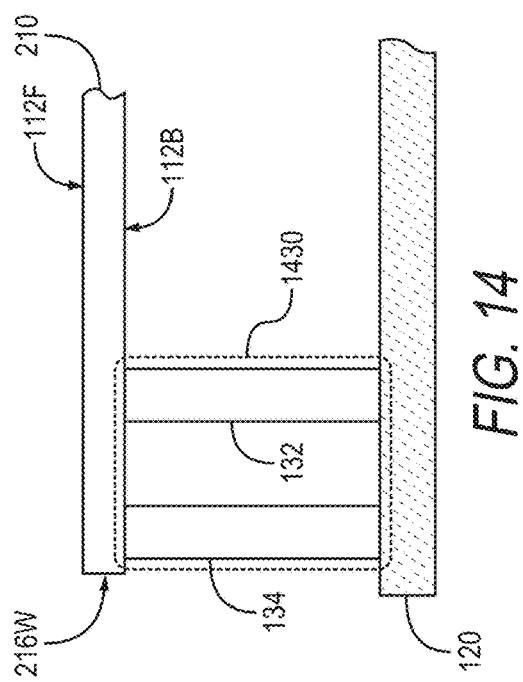
FIG. 14 illustrates a bracket-free thermal actuator, according to an embodiment.

FIG. 14 illustrates, in cross section, a bracket-free thermal actuator 1430 that may replace actuators 230 and 830 in any one of adaptive optics 200, 800, and 1000. Actuator 1430 omits bracket 236/836. Instead, rods 132 and 134 are rigidly bonded directly to back surface 112B of reflector 210 (or reflector 1010). The bonds between back surface 112B and rods 132 and 134 may cause local surface-figure perturbations that were at least mostly avoided with actuators 230 and 830 bonded to sidewall 216W. However, actuator 1430 is a simpler structure than either one of actuator 230 and 830. Additionally, the bracket-to-reflector bond and any associated risk of this bond being sheared by the forces applied by rods 132 and 134 are eliminated by bonding rods 132 and 134 directly to the reflector. In scenarios where some degree of local surface-figure perturbation is acceptable, at least outside a more central region, the bracket-free design of actuator 1430 may be preferred.

Figure 15:
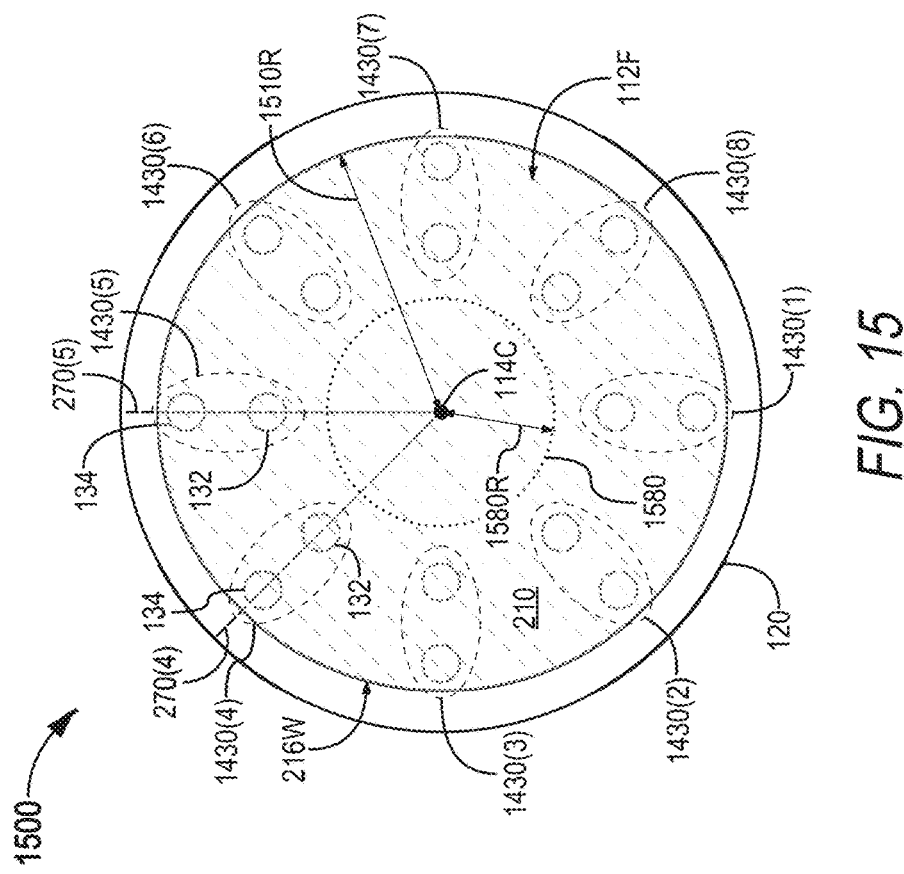
FIG. 15 is a top-view of an adaptive optic with thermal-actuation rods bonded directly to the backside of a reflector, according to an embodiment.

FIG. 15 is a top-view of one adaptive optic 1500 with thermal-actuation rods rigidly bonded directly to the backside of the reflector. Adaptive optic 1500 is a modification of adaptive optic 200 that implements actuators 1430 instead of actuators 230. When operated to tip, tilt, or deform reflector 210, actuators 1430 are likely to cause local surface-figure perturbations. However, since actuators 1430 are distributed peripherally along the perimeter of reflector 210, a central region 1580 may be essentially unaffected by such local surface-figure perturbations and thus form a "clear aperture" of adaptive optic 1500. In one embodiment, each inner rod 132 is closer to sidewall 216W than center 114C of reflector 210, and the radius 1580R of central region 1580 is between 20 and 60 percent of the radius 1510R of reflector 210 (or, for non-circular reflectors 210, between 20 and 60 percent of half the maximum transverse extent 110D).

Figure 16B:
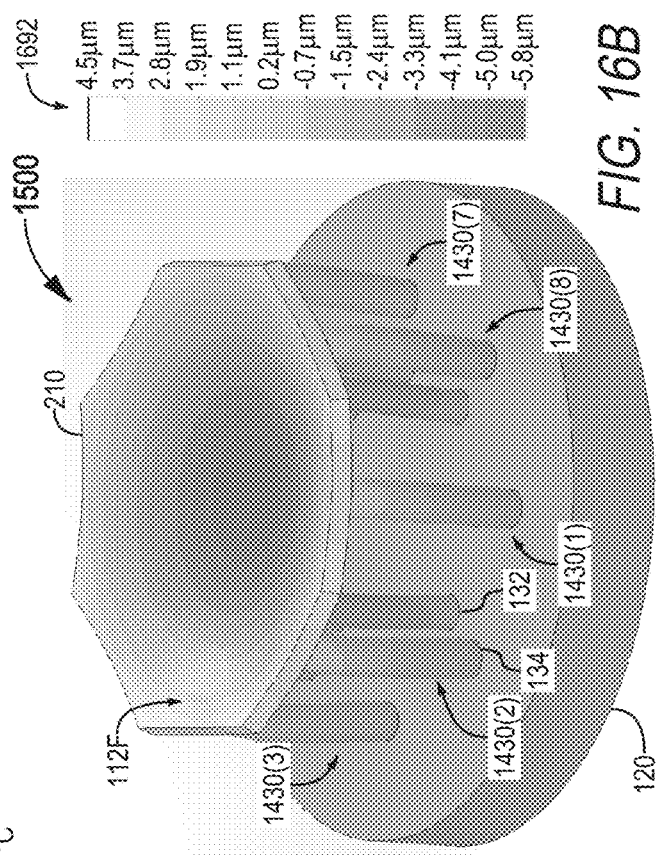
FIGS. 16A and 16B show modeling results in a focusing-scenario of an example of the FIG. 15 adaptive optic.
Figure 16A:
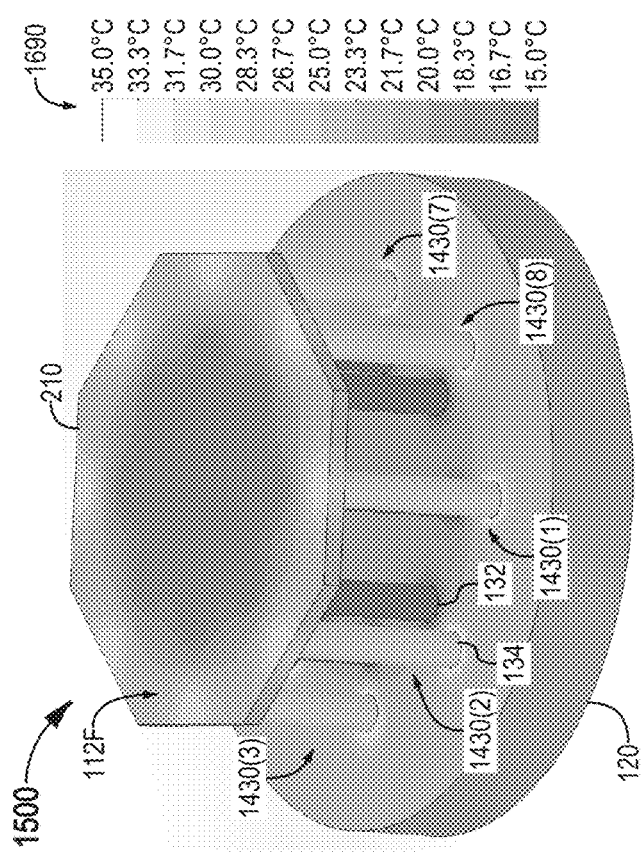

FIGS. 16A and 16B show modeling results in a focusing-scenario of one example of adaptive optic 1500. FIG. 16A indicates the temperature distribution of adaptive optic 1500 according to greyscale 1690. FIG. 16B indicates the corresponding physical shape of adaptive optic 1500 according to greyscale 1692, with shape changes exaggerated for clarity.

The example of adaptive optic 1500 investigated here is similar to the example of adaptive optic 200 investigated in FIGS. 6A and 6B, except that actuators 1430 replace actuators 230 (actuators 1430(4-6) are hidden from view in FIGS. 16A and 16B). Inner rods 132 are positioned 7.75 mm from the center of reflector 210, and outer rods 134 are positioned 11.25 mm from the center of reflector 210. In the present focusing-scenario, each actuator 1430 is operated in the same manner. The temperature of inner rod 132 is set to 15 degrees Celsius, and the temperature of outer rod 134 is set to 35 degrees Celsius. These temperatures result in front surface 112F being concave. The surface profile is found to be essentially parabolic and free from local surface-figure perturbation.

Figure 17A:
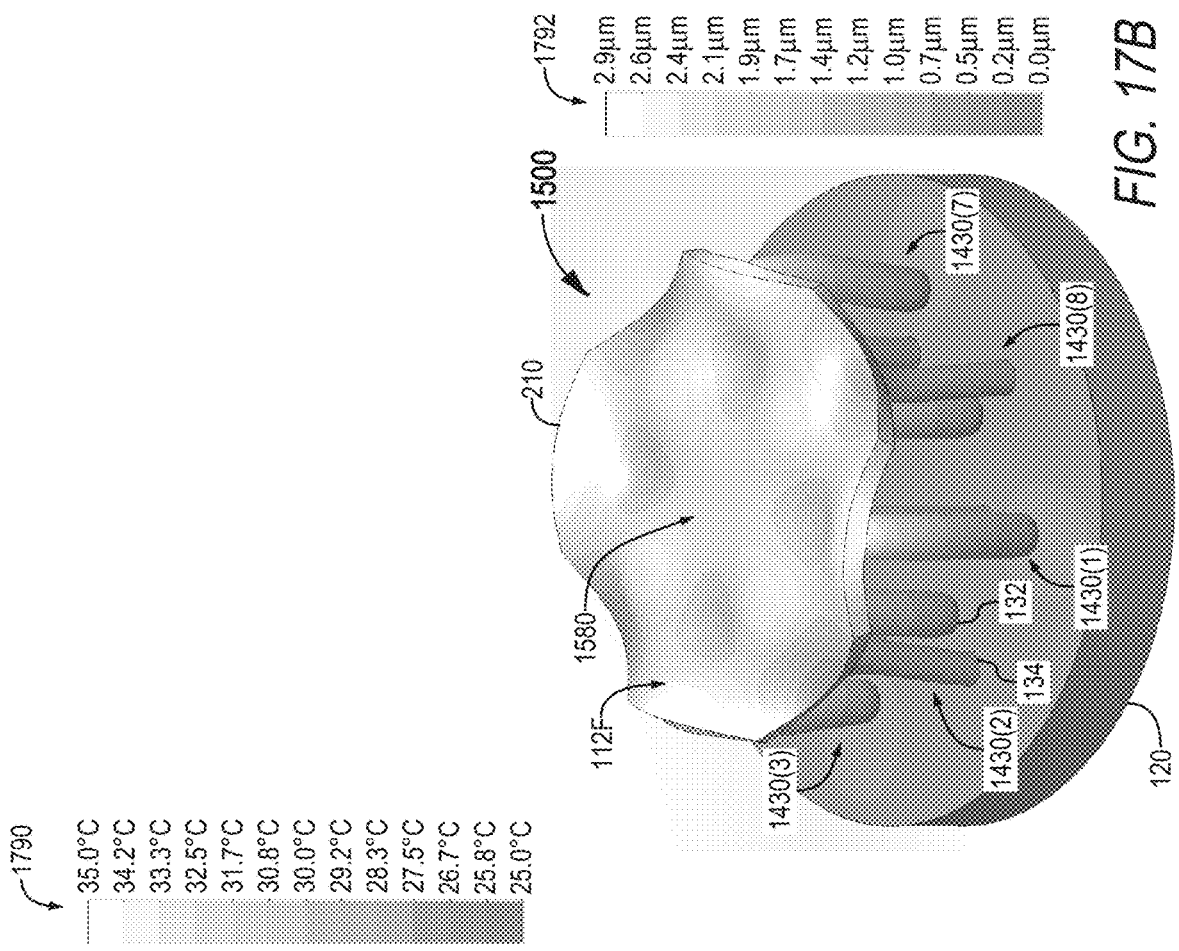
FIGS. 17A and 17B show modeling results in a complex-deformation-scenario of an example of the FIG. 15 adaptive optic.
Figure 17B:
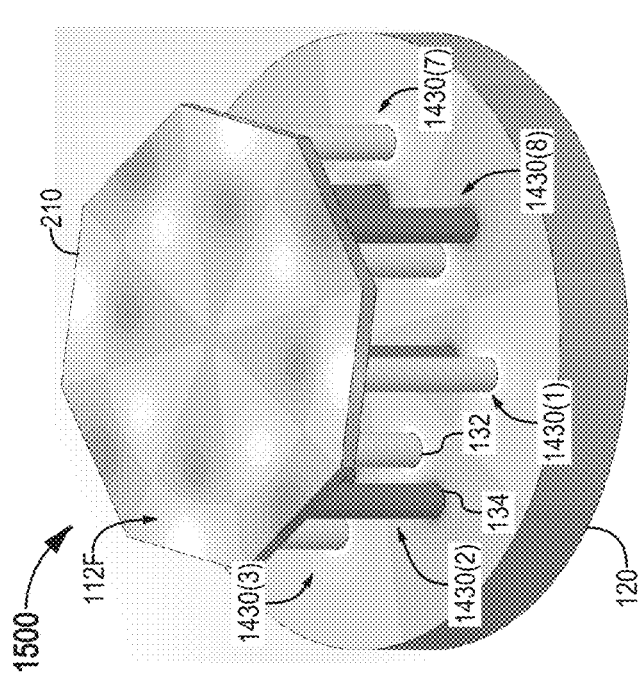

FIGS. 17A and 17B show modeling results in a complex-deformation-scenario of the same embodiment of adaptive optic 1500 studied in FIGS. 16A and 16B. FIG. 17A indicates the temperature distribution of adaptive optic 1500 according to greyscale 1790. FIG. 17B indicates the corresponding physical shape of adaptive optic 1500 according to greyscale 1792, with shape changes exaggerated for clarity. Actuators 1430(4-6) are hidden from view in FIGS. 17A and 17B.

The present complex-deformation-scenario is similar to that of adaptive optic 200 in FIGS. 7A and 7B, although different temperatures are applied to the present example of adaptive optic 1500. Here, each of actuators 1430(1), 1430(3), 1430(5), and 1430(7) is tilted inward by setting (a) the temperature of inner rod 132 to 25 degrees Celsius and (b) the temperature of outer rod 134 to 35 degrees Celsius, while each of actuators 1430(2), 1430(4), 1430(6), and 1430(8) is tilted outward by setting (a) the temperature of inner rod 132 to 35 degrees Celsius and (b) the temperature of outer rod 134 to 25 degrees Celsius. Unlike in the focusing-scenario of adaptive optic 1500 (FIGS. 16A and 16B) and unlike in the complex-deformation-scenario of adaptive optic 200 (FIGS. 7A and 7B), local surface-figure perturbation of reflector 210 is apparent where rods 132 and 134 connect to reflector 210. However, within a central region 1580 characterized by a diameter that is approximately 30% of the maximum transverse extent of reflector 210, the surface profile is found to be free from local surface-figure perturbation. Within this central region 1580, reflector 210 is deformed in a manner that resembles Zernike polynomial $Z_{4,4}(r, \theta)$.

FIG. 18 illustrates, in cross section, one adaptive optic 1800 with an integrally formed, thermally actuated support. Adaptive optic 1800 includes a reflector 1850 and an integrally formed support 1860. Support 1860 includes a platform 1810, a base 1820, and a plurality of actuators 1830 each connecting platform 1810 and base 1820. Platform 1810 has a front surface 1812F on which reflector 1850 is disposed, and a back surface 1812B facing base 1820. Each actuator 1830 includes inner rod 132 and outer rod 134. While only two actuators 1830 are shown in FIG. 18, adaptive optic 1800 may include three or more actuators, as discussed above in reference to FIGS. 1, 2A, and 2B.

Adaptive optic 1800 is equivalent to a modification of adaptive optic 1500, wherein (a) base 120, actuators 1430, and reflector 210 are one integrally formed part, and (b) instead of reflector 210 itself being reflective, a separate reflector is disposed its front surface 112F. As compared to adaptive optic 1500, adaptive optic 1800 eliminates the need for coupling the ends of rods 132 and 134 to other parts. Integrally formed support 1860 eliminates any risk of such couplings being compromised during operation, for example bonds being sheared by the forces applied by rods 132 and 134.

In one embodiment, reflector 1850 is a coating deposited directly on front surface 1812F of platform 1710. For example, reflector 1850 is a metal coating. In another embodiment, reflector 1850 includes a substrate bonded to front surface 1812F, and a reflective coating deposited on a surface of this substrate facing away from platform 1810. In one example, this substrate is a glass substrate. In another example, this substrate is silicon. The substrate may be thinner than platform 1810 to ensure that the substrate conforms to deformation of platform 1810 induced by actuators 1830.

The thickness 1820T of base 1820 may exceed the thickness 1810T of platform 1810 in order to ensure that base 1820 is more rigid than platform 1810, such that actuators 1830 may deform platform 1810 without significantly deforming base 1820. Alternatively, base 1820 may be affixed to another structure providing such rigidity.

In a modification of adaptive optic 1800, base 1820 is separate from the integrally formed support. In this modification, rods 132 and 134 are instead rigidly connected to base 1820. While this modification reintroduces connections between the base and the rods, rigidity of base 1820 may reduce the risk of these connections being compromised (e.g., bonds shearing), as compared to bonds between a deformable reflector and the other ends of the rods.

Referring again to actuators 230 and 830, for the purpose of reducing the number of connections, each of these actuators may be modified to be a single, integrally formed piece, that is, with rods 132 and 134 being integrally formed with bracket 236/836.

Figure 19:
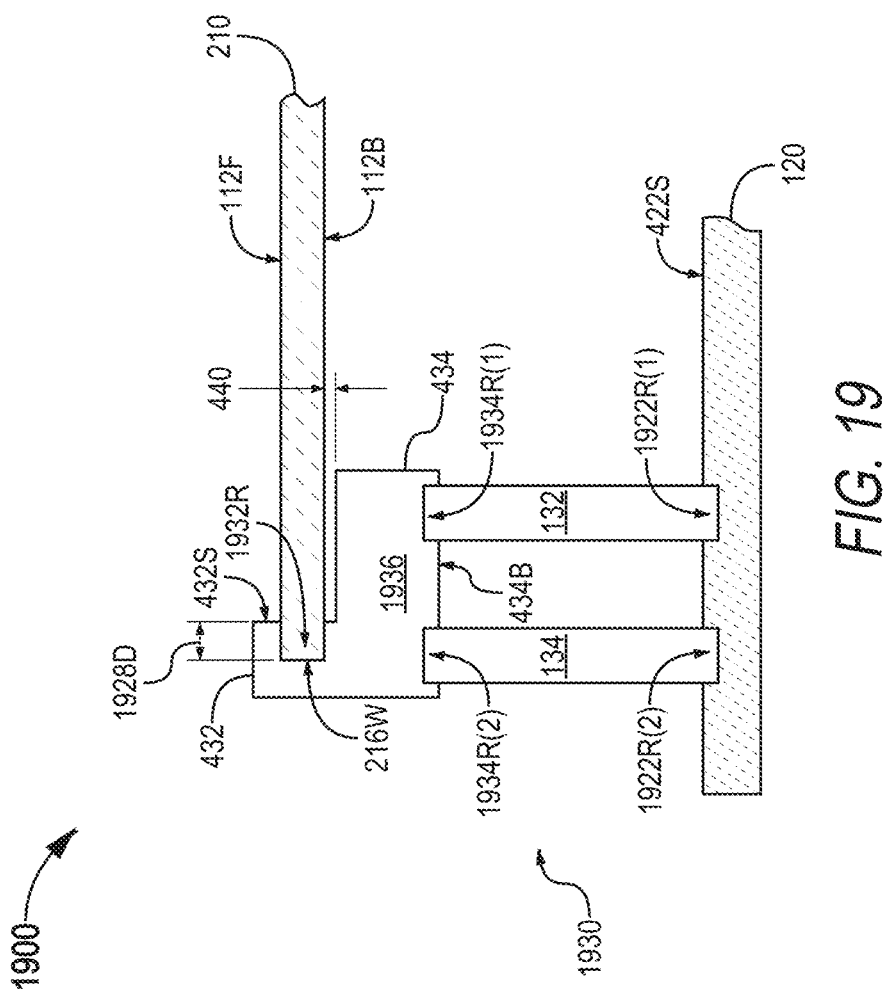
FIG. 19 illustrates an adaptive optic with thermal actuators that are bonded not only to the side-wall but also to peripheral portions of the top and bottom surfaces of the reflector, according to an embodiment.

FIG. 19 is a cross section of one adaptive optic 1900 with thermal actuators that are bonded not only to the side-wall but also to peripheral portions of the top and bottom surfaces of the reflector. Adaptive optic 1900 is an embodiment of adaptive optic 200 that implements actuators 1930 forming a recess 1932R for seating the perimeter of reflector 210 therein. FIG. 19 shows only a partial view of adaptive optic 1900 featuring a portion of adaptive optic 1900 near one of its actuators 1930. Actuator 1930 is similar to actuator 230 except that surface 432S of leg 432 forms a recess 1932R matching the shape of reflector 210. By virtue of recess 1932R, not only sidewall 216W but also a portion of top surface 112T and back surface 112B are bonded to leg 432 of bracket 1936, thereby strengthening the bond between reflector 210 and actuator 1930. The extent 1928D of the bond between bracket 1936 and the top and bottom surfaces of reflector 210 may be in the range between 1 and 20 percent of maximum transverse extent 110D of reflector 210, such that a substantially sized central portion of reflector 210 is free of local surface-figure perturbations caused by the rigid bond between reflector 210 and recess 1932R.

Optionally, the connections between rods 132/134 and one or both of base 120 and bracket 1936 are similarly strengthened. Each of rods 132 and 134 may be seated in and bonded to a respective recess 1934R in bottom surface 434B of leg 434 of bracket 1936. For each actuator 1930, each of rods 132 and 134 may be seated in and bonded to a respective recess 1922R in surface 422S of base 120.

Adaptive optic 800 and 1000 may be modified to implement any one of recesses 1932R, 1934R, and 1922R. Adaptive optic 1500 may be modified to implement recesses 1934R and/or 1922R.

The present invention is described above in terms of a preferred embodiment and other embodiments. The invention is not limited, however, to the embodiments described and depicted herein. Rather, the invention is limited only by the claims appended hereto.

What is claimed is:

1. A thermally actuated adaptive optic, comprising:
   a base;
   a reflector having a front surface for receiving incident light, and a back surface facing the base, the reflector having a maximum transverse extent, between two locations on a perimeter located on two opposite sides, respectively, of a center of the reflector, in a range between 6 and 100 millimeters; and
   a plurality of actuators coupled between the base and the reflector, each actuator including:
      a bracket rigidly bonded to the reflector at the perimeter of the reflector, and
      an inner rod and an outer rod, each rigidly connected to and joining the bracket and the base, the inner rod being closer than the outer rod to the center, the length of each rod between the bracket and the base being temperature dependent, the length of each rod being in a range between 5 and 30 millimeters.

2. The adaptive optic of claim 1, wherein:
   the reflector includes a sidewall spanning between the front and back surfaces and surrounding the reflector, and
   the rigid bond between each bracket and the reflector is confined to the sidewall.

3. The adaptive optic of claim 2, wherein:
   the front surface of the reflector includes a reflective coating,
   the reflector has two opposite ends,
   the plurality of actuators is composed of two actuators, and
   the bracket of each of the two actuators is rigidly bonded to the sidewall at a respective one of the two opposite ends.

4. The adaptive optic of claim 1, wherein the plurality of actuators includes at least four actuators distributed along the perimeter of the reflector.

5. The adaptive optic of claim 1, wherein the plurality of actuators includes at least eight actuators distributed along the perimeter of the reflector.

6. The adaptive optic of claim 1, wherein, for each actuator, positions of the inner and outer rods, as projected onto the back surface of the reflector, are on a line from the center to the perimeter.

7. The adaptive optic of claim 1, wherein the reflector is a glass substrate with a reflective coating forming the front surface.

8. A thermally actuated adaptive optic, comprising:
   a base;
   a reflector having a front surface for receiving incident light, and a back surface facing the base, the reflector including a sidewall spanning between the front and back surfaces and surrounding the reflector; and
   a plurality of actuators coupled between the base and the reflector, each actuator including:
      a bracket rigidly bonded to the reflector at a perimeter of the reflector, the rigid bond between each bracket and the reflector being confined to the sidewall, each bracket including two orthogonal legs arranged in an L-shape, a first one of the two legs being rigidly bonded to the sidewall, a second one of the two legs (a) extending along the back surface in a direction toward a center and (b) being separated from the back surface by a gap, and
      an inner rod and an outer rod, each rigidly connected to and joining the bracket and the base, the inner rod being closer than the outer rod to the center of the reflector, the length of each rod between the bracket and the base being temperature dependent, the inner and outer rods being rigidly connected to a surface of the second leg facing the base.

9. The adaptive optic of claim 8, wherein at least the inner rod is within a footprint of the reflector.

10. The adaptive optic of claim 8, wherein, for each actuator, positions of the inner and outer rods, as projected onto the back surface of the reflector, are on a line from the center to the perimeter.

11. The adaptive optic of claim 8, wherein the reflector is a glass substrate with a reflective coating forming the front surface.

12. The adaptive optic of claim 8, wherein:
   the front surface of the reflector includes a reflective coating,
   the reflector has two opposite ends,
   the plurality of actuators is composed of two actuators, and
   the bracket of each of the two actuators is rigidly bonded to the sidewall at a respective one of the two opposite ends.

13. The adaptive optic of claim 8, wherein the plurality of actuators includes at least four actuators distributed along the perimeter of the reflector.

14. A thermally actuated adaptive optic, comprising:
   a base;
   a reflector having a front surface for receiving incident light, and a back surface facing the base; and
   a plurality of actuators distributed along a perimeter of the reflector and connecting the base and the reflector, each actuator including:
      an inner rod rigidly connected between the base and the back surface, and
      an outer rod rigidly connected between the base and the back surface;
   wherein for each actuator, (a) the inner and outer rods are rigidly bonded to the back surface outside a central circular region of the back surface, a radius of the central circular region being at least 20 percent of half a maximum transverse extent of the reflector along the back surface, (b) the inner rod is closer than the outer rod to a center of the reflector, and (c) the length of each of the inner and outer rods between the reflector and the base is temperature dependent; and
   wherein the central circular region is free of rods rigidly connected between the base and the back surface.

15. The adaptive optic of claim 14, wherein, for each actuator, the inner and outer rods are positioned on a line from the center to the perimeter.

16. The adaptive optic of claim 15, wherein, for each actuator, the inner rod is closer to the perimeter than the center.

17. The adaptive optic of claim 14, wherein the reflector is a glass substrate with a reflective coating forming the front surface.

18. The adaptive optic of claim 14, wherein, for each actuator, the inner rod is closer to the outer rod than to the center of the reflector.

\* \* \* \* \*